US008036960B2

(12) United States Patent
Dean et al.

(10) Patent No.: US 8,036,960 B2
(45) Date of Patent: Oct. 11, 2011

(54) SYSTEM AND METHOD FOR COORDINATING THE COLLECTION, ANALYSIS AND STORAGE OF PAYROLL INFORMATION PROVIDED TO GOVERNMENT AGENCIES BY GOVERNMENT CONTRACTORS

(75) Inventors: T. Phillip Dean, Germantown, TN (US); Richard Edwin DeHority, Bartlett, TN (US); James Michael DeHority, Germantown, TN (US); Woodrow W. Chamberlain, Scottsdale, AZ (US)

(73) Assignee: eMars, Inc., Germantown, TN (US)

( * ) Notice: Subject to any disclaimer, the term of this patent is extended or adjusted under 35 U.S.C. 154(b) by 1459 days.

(21) Appl. No.: 10/404,657

(22) Filed: Apr. 2, 2003

(65) Prior Publication Data
US 2004/0158512 A1    Aug. 12, 2004

Related U.S. Application Data

(60) Provisional application No. 60/446,559, filed on Feb. 12, 2003.

(51) Int. Cl.
*G07B 17/00* (2006.01)
*G06F 17/22* (2006.01)

(52) U.S. Cl. ........................................... 705/32; 705/30

(58) Field of Classification Search .................... None
See application file for complete search history.

(56) References Cited

U.S. PATENT DOCUMENTS

| | | | | |
|---|---|---|---|---|
| 5,600,554 A | * | 2/1997 | Williams | 705/1 |
| 6,347,306 B1 | * | 2/2002 | Swart | 705/32 |
| 6,401,079 B1 | * | 6/2002 | Kahn et al. | 705/30 |
| 6,601,048 B1 | * | 7/2003 | Gavan et al. | 706/10 |
| 6,681,210 B2 | * | 1/2004 | Kelly | 705/32 |
| 2003/0061132 A1 | * | 3/2003 | Yu et al. | 705/30 |

* cited by examiner

*Primary Examiner* — Fahd Obeid
(74) *Attorney, Agent, or Firm* — Womble Carlyle Sandridge & Rice, PLLC

(57) ABSTRACT

A method for systematically coordinating the collection, analysis and storage of payroll information provided to government agencies by government contractors pursuant to applicable regulations is disclosed. The method includes collecting payroll information from contractors, performing an automated compliance check on the payroll information collected from contractors, storing verified payroll information in at least one database, and performing an automated fraud check on payroll information. The method also includes notifying auditors of instances of possible fraud, notifying auditors of instances of non-compliance, sorting payroll information in the at least one database according to geographic and skill categories, and providing reports to agencies.

20 Claims, 2 Drawing Sheets

SYSTEM AND METHOD FOR COORDINATING THE COLLECTION, ANALYSIS AND STORAGE OF PAYROLL INFORMATION PROVIDED TO GOVERNMENT AGENCIES BY GOVERNMENT CONTRACTORS

This application claims the benefit of U.S. Provisional Application No. 60/446,559, filed Feb. 12, 2003, which is herein incorporated by reference in its entirety.

BACKGROUND OF THE INVENTION

1. Field of the Invention

Embodiments of the present invention relate to automated wage compliance, auditing and fraud detection systems and methods. More particularly, embodiments of the present invention relate to systems and methods collecting and storing payroll information, determining compliance with applicable regulations, and identifying non-compliance and potential fraud.

2. Background Information

Currently state and federal government contractors are required to submit weekly payroll information utilizing government forms, such as WH-347 used by the U.S. Government. This information is reviewed to ensure compliance with applicable regulations governing, for example, the wage rate for a certain skill in a certain locale. The submission and review of payroll information can often be time consuming for both the contractors and the government agencies overseeing the various contracts and/or projects. In addition, this information must periodically be audited in order to verify compliance with a multitude of employment and other regulations. At present, there is no systematic way to identify potentially fraudulent reports.

Currently, this information is often maintained only in hard copy format. Regulations require the government and the contractors both to maintain this information for anywhere from three to seven years. As can be expected, such record storage necessitates large storage locations, which can be costly to all parties involved. In addition to storage issues, hard copy storage makes the task of auditing these records even more difficult.

In view of the foregoing, it can be appreciated that a substantial need exists for systems and methods that can advantageously provide for automated payroll record keeping that allows for electronic storage, customized reporting, and automated auditing and error checking, among other capabilities.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

SUMMARY OF THE INVENTION

The present invention provides a systematic approach to collecting payroll information, analyzing the information for compliance with applicable regulations, providing reports or query access by relevant government agencies and identifying possible instances of fraud.

An important aspect of the systematic approach of the present invention is integrating the actions of four distinct groups of participants in the process and coordinating the collection and analysis of information. The four groups involved may be characterized as government contractors and subcontractors, compliance auditors, government agencies (in the case of the Federal Government this would be the Department of Labor or more specifically the ESA, Employment Standards Administration) and a system operator for coordinating the systems that facilitate the systematic approach of the present invention.

In accordance with an aspect of the present invention, the system provides a web-based system for allowing contractors or subcontractors to enter information. In the currently preferred embodiment, this information would be payroll information that is required with regard to government regulations concerning wage and hour payments by government contractors. As currently contemplated, the information can either be input by the contractor using a web interface or automatically uploaded from a payroll company such as ADP or People Soft. To facilitate automatic upload, this system provides an interface adapter that allows information from the payroll database to be automatically uploaded to the database of the present invention.

Regardless of how the information is provided to the system database, once provided, the system—analyzes the information upload for compliance with applicable regulations and provides a list of variances or exceptions. For a contractor using the web-based interface, this will result in an immediate error notification so that the contractor can put in correct information. In the case of automatically uploaded information from a payroll processor, the information is analyzed on a batch basis and any exceptions or variances are reported back to allow for correction. Thus, an important aspect to the present invention is on-line, in some cases real time, verification of information entered to correct clerical mistakes and the like.

In accordance with another aspect of the present invention the information that is uploaded is stored in a database thereby lessening the need to store paper records.

Another aspect of the present invention is the aforementioned automatic upload of information from a payroll processor such as ADP, People Soft or Timberline whereby the system extracts required information from the payroll database through the use of a payroll interface that is adapted for each particular payroll provider.

Once the information is input into the database and satisfies the on-line verification and compliance checks, additional information is made available to the auditor. In particular, the system analyzes the information provided by the contractor to identify possible instances of fraud. This is done by comparing information as submitted and performing a statistical analysis (e.g., checking ratios) to identify instances that might be indicative of fraud. More specifically, the data submitted by the contractor is compared to a set of normally expected ranges both on an individual and whole job basis to identify possible instances of fraud.

The system also preferably provides handheld devices to allow more efficient field surveys. In the currently preferred embodiment, the handheld devices are .net programmable iPaq handheld pocket PC's. Equipped with these handheld devices, auditors can conduct automated field surveys with a series of questions affecting a particular area, store the data and upload the data to the system. By virtue of the collection and auditing functions, the information obtained within the database is more reliable and can be used to detect instances of fraud. In addition, the collection of this information in a database makes it easy to generate reports for government agencies. In the case of the Federal Government, for example the Department of Labor, and more specifically the Employment Standards Administration is able to generate the required reports, or, alternatively query the database to obtain the desired information. A similar process is available to relevant state agencies.

From the foregoing, it should be clear that there are several significant aspects of the present invention. The present invention is particularly applicable in the context of government agencies requiring payroll certification, i.e., under which the contractor must provide information under the penalty of law, information regarding payroll in compliance with applicable regulations.

The system provides an approach that incorporates all four constituent groups, (contractors, auditing agencies, reporting agencies and the system operator) in a systematic approach. The system allows simple input of data by the contractor including on-line input and real time verification of information input so that, wage determination and worker classification rates for each locality are captured and stored in a database.

The system benefits compliance auditors by providing systematic identification of possible instances of fraud and also identifying mistakes through statistical analysis (ratio checking and the like.)

By gathering the information in a single database, or multiple integrated databases the system also simplifies report generation and allows, if desired, querying of the database to obtain specific information. As used herein, the term database may refer to a single database or a plurality of databases accessible by one or more users of the system.

In part, the present invention results from a recognition that cooperation among all four constituent groups is necessary to arrive at a workable solution.

DETAILED DESCRIPTION OF THE INVENTION

Embodiments of systems and methods related to automated payroll entry and auditing are described in this detailed description of the invention. In this detailed description, for purposes of explanation, numerous specific details are set forth to provide a thorough understanding of embodiments of the present invention. One skilled in the art will appreciate, however, that embodiments of the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of embodiments of the present invention.

A web-based system is needed to allow contractors to input data that government agencies require when prevailing wage rates and/or minimum wage rates are applicable and enforced. Such information may include, for example, employee name, social security or other employee identification number, address, age, gender, race, job skill level, wage rate, weekly hours worked, project information, etc. This system enables contractors, subcontractors, developers, for profit and non-profit entities, architects, engineers, consultants and any person or persons engaged in contract management, the ability to submit their required certified payroll reports to their respective government contracting agencies.

Figure 1:
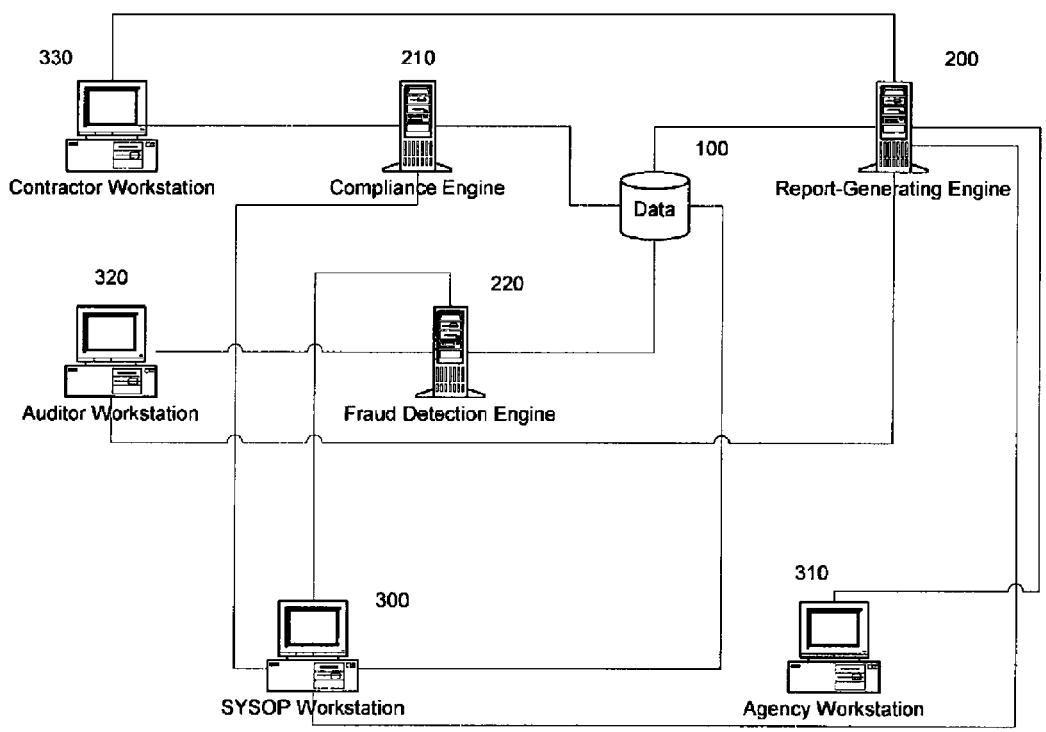
FIG. 1 is a network diagram of a payroll system.

FIG. 1 shows an exemplary network of users and software engines connected to a central database. Database 100, is connected to various users via a number of interfaces. The interfaces allow users to extract or input information into the system according to their individual needs. For example, report-generating engine 200 is accessible by all users including contractors, auditors, agencies, and a system operator. Other interfaces such as compliance engine 210 and fraud detection engine 220 are accessible by the parties needing to use these functions. The various engines may be accessible through workstations 300, 310, 320, and 340. Although FIG. 1 depicts a general network connection, the connections between the various portions of the network may either be direct connections or they may otherwise be connected, for example, via the Internet. These various interfaces will be described in more detail below.

Within the system of FIG. 1, various users would have various responsibilities. For example, the database managers or system operators may be responsible for ensuring that the system is operational and accessible by other users substantially all the time. System operators may also be responsible for backing up the system, maintaining firewall security, and assigning passwords. Once the system is in place, system operators may also be responsible for tasks such as developing new reporting capabilities and writing software to allow users to import payroll information from various outside payroll systems.

Another user, the controlling governmental authority, would be responsible for directing agencies to follow governing certified payrolls. They may also enter additional information into the database to allow for completion of their reports. In addition, they may be able to query the database for varied and customized statistical reports as well as following employment and wage and hour trends.

Compliance auditors may set up various contracts and/or projects with which they are concerned. This may allow them to match contractors and wage determinations with new contracts/projects. Auditors may then check daily audit lists for out of compliance contractors as well as daily ratios for ratio variances. Auditors may also have the capability of accessing the system via a handheld device so that they may check payroll information while in the field. Auditors may then upload audit information from the handheld device to the database.

General contractors and subcontractors may have the ability to set up payroll information on all employees. They may then enter weekly time card data and finalize payroll and certify with a digital signature. Contractors may also be able to perform audits on their subcontractors to ensure that they are properly in compliance with applicable regulations.

Although all entities involved would benefit from such a system utilized by each entity individually, a number of the major benefits only accrue when multiple parties take part in its use. For example, contractors would benefit from a real-time error check of payroll entries, but in and of itself, such a benefit may not be significant enough for contractors to pay for this benefit alone. Also, government agencies would benefit from automated auditing capabilities, but without the real-time error checking of the raw data, simple clerical errors could be interpreted as fraudulent activity during an audit. By developing a system that is utilized by and benefits all parties involved, each individual entity may benefit in a greater manner than any one of them would if they only had access to the portion of the system they each use. The integration of all users into such a payroll system benefits the whole in a manner greater than the benefit to any one individual.

Currently, contractors provide this information by filling out a form for each employee, such as U.S. government form WH-347, in hard copy format and then submitting it to the relevant agency. Each agency contracts these projects to private entities and is then tasked with reviewing these submitted forms for completeness and accuracy as well as performing periodical audits to check for fraud or other forms of non-compliance. Due to sheer volume, often auditors are able to do nothing more than scan these forms for completeness and are incapable of providing the level of scrutiny necessary to find errors or other evidence of fraud.

Figure 2:
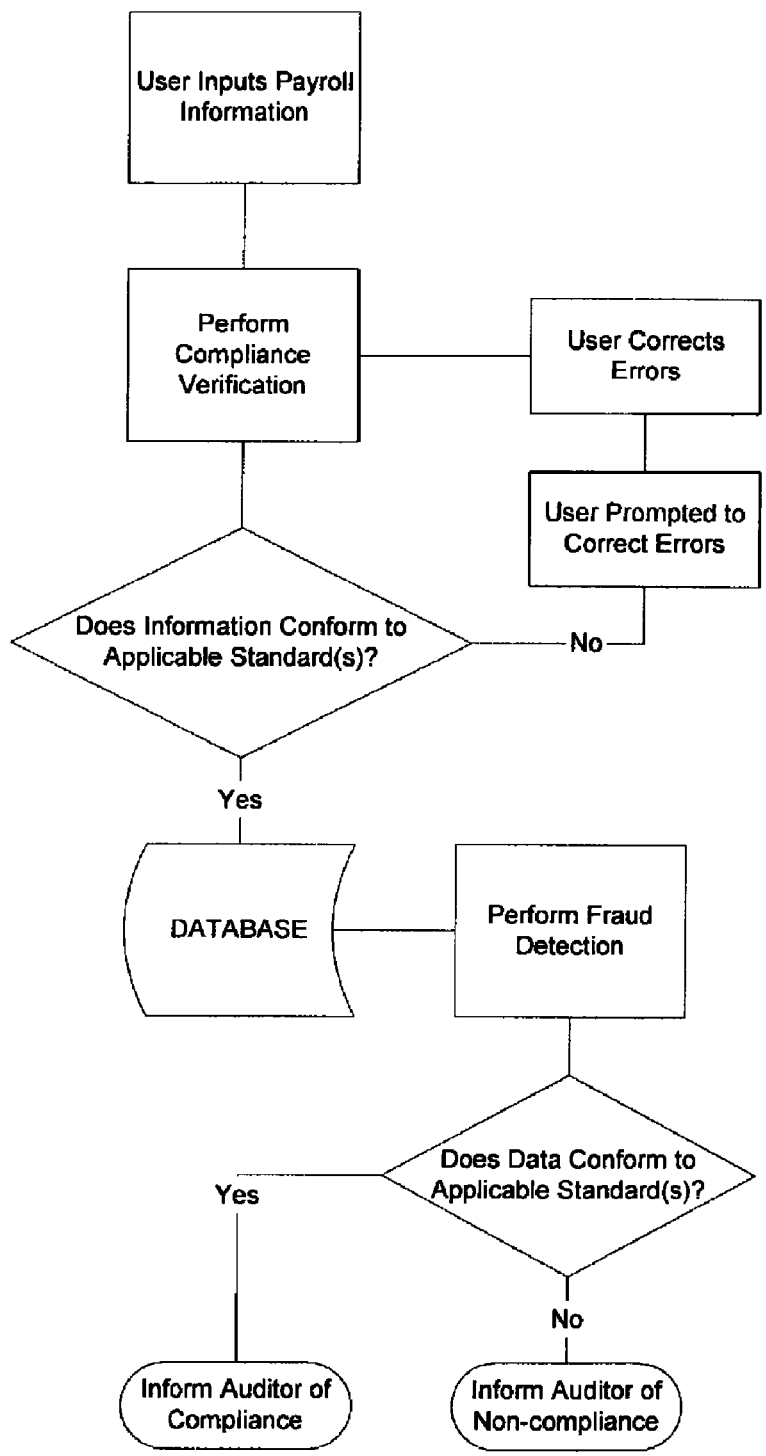
FIG. 2 is a flow chart showing the compliance and auditing functions of the payroll system of FIG. 1.

This system, in one aspect, is designed to produce a coded and text audit/diagnostic with suggested text remedies to be received instantaneously, or nearly so, both prior to submission (for contractor benefit) and upon submission (for agency benefit). The audit/diagnostic feature is predicated upon the applicable wage rate standard(s) that the government-contracting agency has assigned to the project/contract. As seen in the top portion of the flowchart shown in FIG. 2, when a user enters information via a user interface relating to each employee, for example wage and hour information, before final submission, the system can check to see if the various entries fall within specified guidelines. This verification process, which may be performed by a compliance engine comprised of one or more software routines for comparing payroll information to applicable regulations, may occur in real-time and may prompt the contractor to correct any errors. For example, if a user attempts to input that an employee worked in excess of forty regular hours, the system can flag this entry as possibly containing an error. By notifying the user of potential errors, the agencies can receive reporting information that contains far fewer user errors and other erroneous information. In addition, by using electronic submission, contractors can receive their payroll disbursements in a more timely fashion.

In addition to the automatic error detection capabilities of the compliance engine associated with direct user entry, large contractors who utilize automated payroll systems will be able to batch load the necessary reporting information directly from their payroll system without need for individual entry. Because most payroll systems already include the necessary reporting information, contractors using such systems can greatly streamline their reporting efforts. Although data may be formatted differently depending on the specific payroll service used, the system would include an interface to translate the data as necessary from a variety of payroll services. The same error-checking routines, however, would still be capable of verifying these batch downloads and could, for example, either report a listing of potential errors or return to the user records with flagged information for review and correction.

This system also renders audit/diagnostics beyond prevailing wage and/or minimum wage standards, for example, the tracking/use of apprentices/trainees/laborers/trades people may be stated in terms of ratios on a per payroll and per daily basis in an effort to detect patterns of fraud and abuse. This diagnostic would likely be revealed to the agency alone and only after the contractor has electronically (via the internet) filed the certified payroll report. Such audit diagnostics could include, for example, statistical analysis of payroll information collected from contractors and could be performed by a fraud detection engine, which may comprise one or more software routines for performing statistical analysis of information collected from contractors. The fraud detection portion of the system is shown in the bottom portion of FIG. 2.

The statistical analysis may include, for example, comparison of collected information to expected ratios or using the information to calculate ratios and then comparing those ratios to expected ranges. For example, most projects require certain ratios of skilled to non-skilled workers. If a user attempts to report a labor force for a specific project that contains too few skilled workers, that user's reporting information can be flagged for further scrutiny by an auditor.

In another example, contractors have been known to set up phony deductions to mask practices such as charging migrant workers a fee for each day worked. This audit function would be able to compare the various deductions noted on the payroll to expected average values and determine if a stated deduction is out of an expected range for that type of deduction. An auditor could then investigate this practice by interviewing employees who appear to have been subjected to suspicious deductions. By automatically comparing such information versus set standards, an auditor can save time by only reviewing those employers with questionable information, rather than having to review voluminous paper records that may contain no deviations from the standards at all.

The subsequent database created by agency/contractor use enables a user to produce other specific statistical data that will be available to government contracting agencies, contractors and any organizations or person(s) having a legitimate use of the project data generally or specifically. For example, if a government contracting agency and its contractors were required to document the project's use of minority workers with respect to some particular definition or standard, this system would track specifically for the project and its participants and maintain a data base of all projects (in the system) to produce comprehensive reports that reflect local/municipal/state/regional and national statistics and trends.

Another feature of this system would be to provide contractors, auditors, agencies, or any other authorized user the ability to create reports generated from the database, for example by a report-generating engine. Some reports may be automatically generated according to required reporting standards and/or templates. Additionally, the system may allow for querying by a user using, for example a database query tool, to create a unique report based on the query. Initially some standard reporting features would be available, but the system would also allow users to create their own automated reporting capabilities by saving a desired query for future use.

As stated above, both agencies and contractors are often required to maintain these payroll records for up to seven years. Physical storage of these records can increase costs tremendously to both parties. One advantageous feature of this payroll system is that all of the necessary record storage can be performed electronically, thus reducing the need for physical storage capacity.

Some portions of this database will be uniquely available in real-time, or nearly so. For example, if an interested party desired to know the rate of pay for a particular worker classification on a particular type of project, the database would allow this search/sort on a real-time basis on any geographical location which was currently reporting. For example, if a contractor or agency needed to know the applicable wage rate in a certain zone or county of a specified state for a worker classification, such as a carpenter, the user would be able to readily access such information. From a contractor side, this information would be useful, for example, in assembling a price quote in order to bid on a certain project or contract.

Additionally, this system creates a database of apparent offenders/violators denoting the nature, number, and dollar value of such violations. For those agencies who are subject to the Department of Labor regulations at 29 CFR part 5.7 they will be able to produce their Semi-Annual Labor Standards Enforcement Report immediately and submit electronically to their specific regional headquarters. For all other contracting agencies (outside of federal jurisdiction) the same data will be available for their own use.

Other reports to be derived from this database may include an Economic Impact Report for local/municipal/state/regional/federal as well as Minority Participation Reports, Apprenticeship Participation Reports, Wage Survey Data Reports, and Local Hiring Compliance Reports. In addition to pre-specified reporting capabilities, this system may allow for a user to run customized queries, thus enabling the user to generate reports containing any information stored in the database. This customizable reporting feature significantly increases the value of such a system to users such as the various government agencies and their auditors.

In an effort to further streamline the audit/diagnostic compliance feature of this web-based certified payroll reporting, an on-site interviewer may record worker classification and employment data in an electronic format (for example, a palm-held computer). This data may then also be compared to the appropriate electronically submitted certified payroll report and again, a coded and text diagnostic may be presented for consideration. Such field audits are currently performed only infrequently due to the auditors' time being occupied by the review of the paper documents.

In accordance with an embodiment of the present invention, instructions adapted to be executed by a processor to perform a method are stored on a computer-readable medium. The computer-readable medium can be a device that stores digital information. For example, a computer-readable medium includes a read-only memory (e.g., a Compact Disc-ROM ("CD-ROM") as is known in the art for storing software. The computer-readable medium can be accessed by a processor suitable for executing instructions adapted to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

As used to describe embodiments of the present invention, the term "coupled" encompasses a direct connection, an indirect connection, or a combination thereof. Two devices that are coupled can engage in direct communications, in indirect communications, or a combination thereof. Moreover, two devices that are coupled need not be in continuous communication, but can be in communication typically, periodically, intermittently, sporadically, occasionally, and so on. Further, the term "communication" is not limited to direct communication, but also includes indirect communication.

In this detailed description, systems and methods in accordance with embodiments of the present invention have been described with reference to specific exemplary embodiments. Accordingly, the present description and figures are to be regarded as illustrative rather than restrictive.

Embodiments of the present invention relate to data communications via one or more networks. The data communications can be carried by one or more communications channels of the one or more networks. A network can include wired communication links (e.g., coaxial cable, copper wires, optical fibers, a combination thereof, and so on), wireless communication links (e.g., satellite communication links, terrestrial wireless communication links, satellite-to-terrestrial communication links, a combination thereof, and so on), or a combination thereof. A communications link can include one or more communications channels, where a communications channel carries communications. For example, a communications link can include multiplexed communications channels, such as time division multiplexing ("TDM") channels, frequency division multiplexing ("FDM") channels, code division multiplexing ("CDM") channels, wave division multiplexing ("WDM") channels, a combination thereof, and so on.

In the foregoing detailed description, systems and methods in accordance with embodiments of the present invention have been described with reference to specific exemplary embodiments. Accordingly, the present specification and figures are to be regarded as illustrative rather than restrictive. The scope of the invention is to be further understood by the numbered examples appended hereto, and by their equivalents.

What is claimed is:

1. A computer-implemented method for systematically coordinating the collection, analysis and storage of payroll information provided to government agencies by government contractors pursuant to applicable regulations, the method comprising:
   collecting, via a computer, payroll information for each of a plurality of employees from a contractor;
   for each of the plurality of employees, performing, via the computer, an automated compliance check on the payroll information collected from the contractor;
   storing, via the computer, verified payroll information in at least one database, the verified payroll information corresponding to the payroll information for each of the plurality of employees that satisfied the automated compliance check;
   performing, via the computer, an automated fraud check on the verified payroll information by analyzing verified payroll information of at least two of the plurality of the employees in the aggregate to identify at least one instance of possible fraud not otherwise identifiable from the verified payroll information of any individual one of the plurality of employees;
   notifying, via the computer, at least one auditor of the at least one instance of possible fraud; and
   providing, via the computer, at least one report to at least one agency,
   wherein said analyzing verified payroll information further comprises:
      calculating a ratio using the verified payroll information,
      comparing the calculated ratio to an expected range, and
      identifying a respective portion of the verified payroll information as the at least one possible instance of fraud when the calculated ratio is outside the expected range for that calculated ratio.

2. The method of claim 1, wherein the payroll information is wage and hour information.

3. The method of claim 1, wherein payroll and hour information is collected from contractors by providing a web-based interface that allow contractors to input information online.

4. The method of claim 3, wherein information collected from contractors is verified in real-time and the contractor is prompted to correct errors.

5. The method of claim 1, wherein payroll and hour information is collected from contractors by automatically extracting and uploading payroll information from a payroll-processing database.

6. The method of claim 5, wherein information uploaded from a payroll-processing database is verified in a batch process and the contractor is prompted to correct errors.

7. The method of claim 1, wherein the reports provided to agencies are automatically generated according to a predetermined template.

8. The method of claim 1, wherein the reports provided to agencies are automatically generated by querying the at least one database.

9. A system for coordinating the collection, analysis and storage of payroll information provided to government agencies by government contractors pursuant to applicable regulations, the system comprising:
networked computers for collecting payroll information from a contractor for each of a plurality of employees;
a compliance engine for performing an automated compliance check on the payroll information collected from the contractor and reporting instances of non-compliance;
at least one database for storing verified payroll information, the verified payroll information corresponding to the payroll information for each of the plurality of employees that satisfied the automated compliance check; and
a fraud detection engine for performing an automated fraud check on the verified payroll information by analyzing verified payroll information of at least two of the plurality of the employees in the aggregate to identify at least one instance of possible fraud not otherwise identifiable from the verified payroll information of any individual one of the plurality of employees and reporting the at least one instance of possible fraud,
wherein the fraud detection engine analyzes verified payroll information by calculating a ratio using the verified payroll information and by comparing the calculated ratio to an expected range, and wherein the fraud detection engine identifies a respective portion of the verified payroll information as the at least one possible instance of fraud when the calculated ratio is outside the expected range for that calculated ratio.

10. The system of claim 9, further comprising a web-based interface that allow contractors to input information online.

11. The system of claim 9, further comprising a payroll-processing database interface facilitating automatic extraction and uploading of payroll information from a payroll-processing database.

12. The system of claim 9, wherein the compliance engine is a software routine that compares payroll information collected from contractors to applicable regulations.

13. The system of claim 9, further comprising a report-generating engine for automatically generating reports based upon information collected from contractors according to a predetermined template.

14. The system of claim 13, wherein the report-generating engine is a software routine that retrieves information from the at least one database and generates reports based according to the predetermined template.

15. The system of claim 9, further comprising a database query tool that allows users to query the at least one database.

16. The system of claim 15, wherein the database query tool is a software routine that formats user requests into database queries.

17. A computer-implemented method for coordinating collection, analysis and storage of payroll information provided to government agencies by government contractors pursuant to applicable governmental regulations, the applicable governmental regulations including governmental compliance regulations and governmental fraud regulations, the method comprising:
collecting, via a computer, payroll information from a government contractor for each of a plurality of employees;
verifying, via the computer, that the collected payroll information for each of the plurality of employees complies with the applicable governmental compliance regulations;
identifying, via the computer, at least a portion of the collected payroll information that does not comply with the governmental compliance regulations;
notifying, via the computer, at least one auditor of the at least the portion of the collected payroll information that does not comply with the governmental compliance regulations;
storing, via the computer, verified payroll information in at least one database, the verified payroll information corresponding to the payroll information that complies with the applicable governmental compliance regulations;
analyzing, via the computer, the verified payroll information of at least two of the plurality of the employees in the aggregate to identify at least one possible instance of fraud not otherwise identifiable from the verified payroll information of any individual one of the plurality of employees;
notifying, via the computer, at least one auditor of the at least one possible instance of fraud; and
providing, via the computer, reports associated with the at least one possible instance of fraud to at least one governmental agency,
wherein said analyzing the verified payroll information further comprises:
calculating a ratio using the verified payroll information, comparing the calculated ratio to an expected range, and identifying a respective portion of the verified payroll information as the at least one possible instance of fraud when the calculated ratio is outside the expected range for that calculated ratio.

18. A computer-implemented method for coordinating collection, analysis and storage of payroll information provided to government agencies by government contractors pursuant to applicable governmental regulations, the applicable governmental regulations including applicable governmental compliance regulations and governmental fraud regulations, the method comprising:
collecting, via a computer, payroll information from a government contractor, the payroll information including a plurality of payroll records, each of the plurality of payroll records corresponding to an employee of the government contractor;
verifying, via the computer, that each of the plurality of payroll records in the collected payroll information individually complies with the applicable governmental compliance regulations;
identifying, via the computer, at least a portion of the collected payroll information that does not comply with the applicable governmental compliance regulations;
notifying, via the computer, at least one auditor of the at least the portion of the collected payroll information that does not comply with the applicable governmental compliance regulations;
storing, via the computer, the plurality of payroll records that comply with the applicable governmental compliance regulations in at least one database;
analyzing, via the computer, the stored plurality of payroll records to identify at least one possible instance of fraud, wherein the stored plurality of payroll records otherwise complies with the applicable governmental compliance regulations but may not comply with the applicable governmental fraud regulations, wherein the analyzing the stored plurality of payroll records comprises collectively analyzing at least a first plurality of the plurality of payroll records to identify the at least one possible instance of fraud that would not be identified from any single one of the plurality of payroll records; and notifying, via the computer, at least one auditor of the at least one possible instance of fraud, wherein said analyzing the stored plurality of payroll records further comprises:

calculating a ratio using the verified payroll information, comparing the calculated ratio to an expected range, and identifying a respective portion of the verified payroll information as the at least one possible instance of fraud when the calculated ratio is outside the expected range for that calculated ratio.

19. The method of claim 1, further comprising sorting payroll information in the at least one database according to geographic and skill categories.

20. The system of claim 9, wherein the payroll information includes geographic and skill categories.

* * * * *